N. KEELING.
COTTON PICKING MACHINE.
APPLICATION FILED SEPT. 9, 1910.
993,834.
Patented May 30, 1911.
2 SHEETS—SHEET 2.
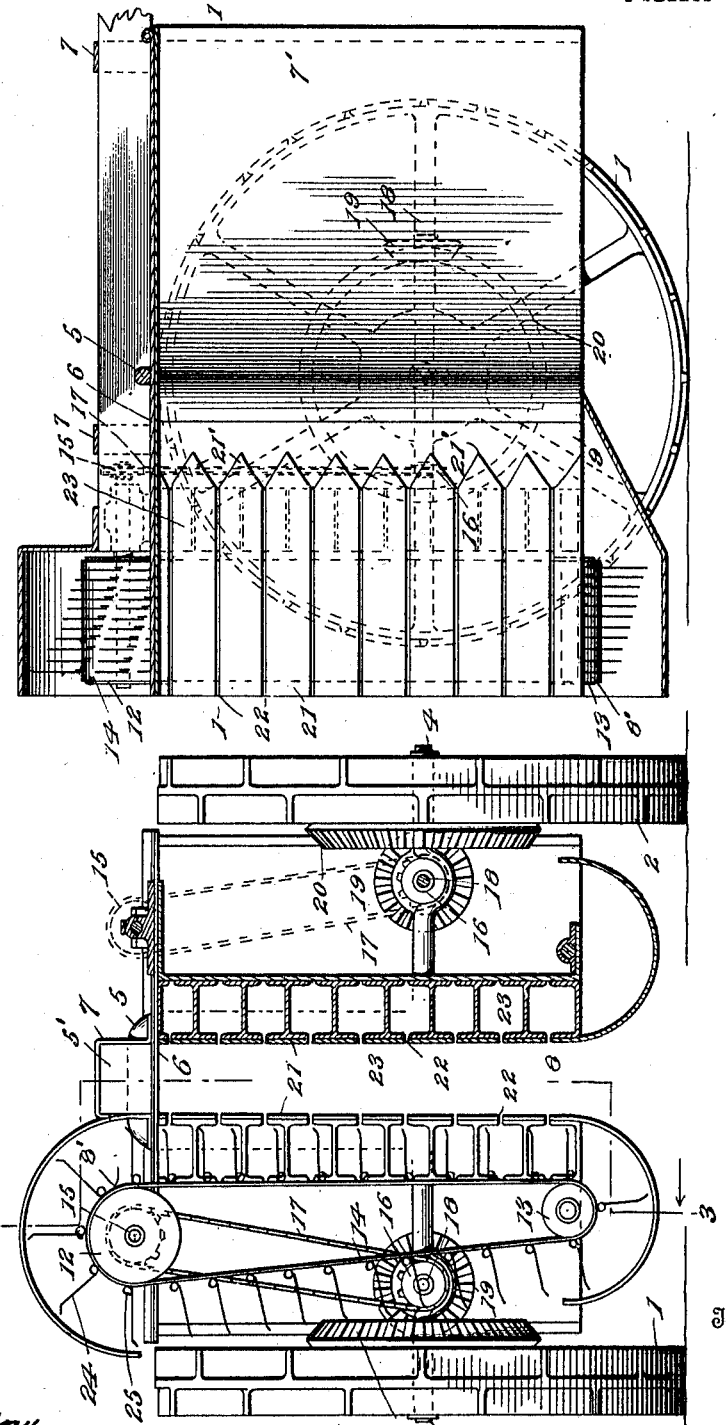

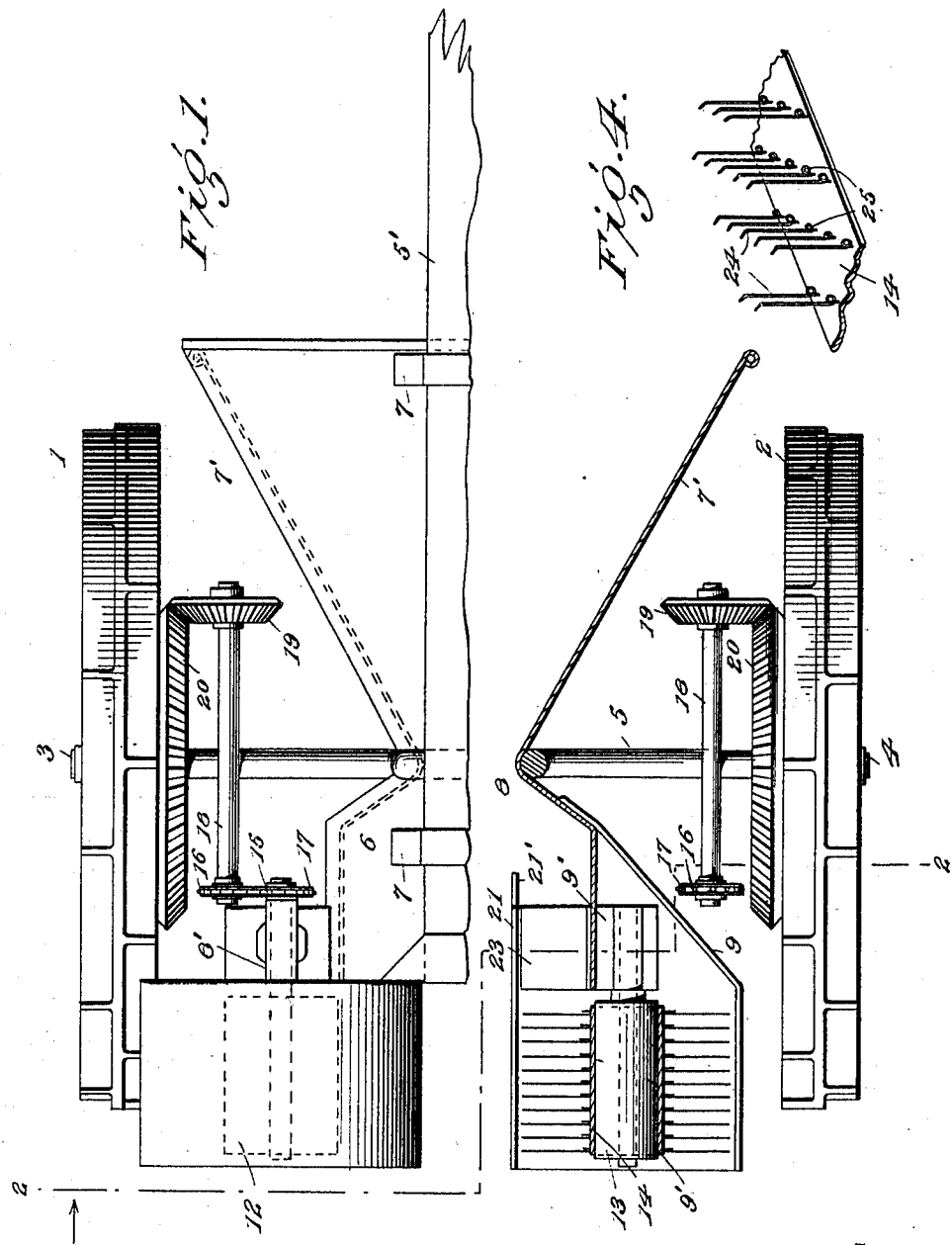

UNITED STATES PATENT OFFICE.

NEWTON KEELING, OF MAUMEE, ARKANSAS, ASSIGNOR OF ONE-FOURTH TO JOHN H. ROBINSON, OF MAUMEE, ARKANSAS.

COTTON-PICKING MACHINE.

993,834.  Specification of Letters Patent.  Patented May 30, 1911.

Application filed September 9, 1910. Serial No. 581,303.

*To all whom it may concern:*

Be it known that I, NEWTON KEELING, a citizen of the United States, residing at Maumee, in the county of Searcy and State of Arkansas, have invented certain new and useful Improvements in Cotton-Picking Machines; and I do hereby declare the following to be a full, clear, and exact description of the invention, such as will enable others skilled in the art to which it appertains to make and use the same.

My invention relates to improvements in cotton picking machines.

The object of my invention is to provide a cotton picking machine of this character which will pick the cotton from both sides of the cotton plant and in which the unopened cotton bolls are allowed to pass through the machine unhurt.

Another object of my invention is to provide a guide for guiding the cotton plant to the slotted guides so as to insure all of the cotton bolls to pass therein without injury to the plant or unopened bolls, and also certain details of structure hereinafter fully set forth.

In the accompanying drawings: Figure 1 is a top plan view of my improved cotton picker showing in section one of the picking belts. Fig. 2 is a vertical sectional view taken on the line 2—2, Fig. 1. Fig. 3 is a vertical sectional view taken on the line 3—3, Fig. 2, and Fig. 4 is an enlarged perspective view of a portion of the picker belt showing in detail the picker fingers and their arrangement on the belt.

Referring now to the drawings: 1 and 2 represent the wheels of my improved picker which are mounted upon the spindles 3 and 4 of the axle 5. This axle is provided with a central inverted U-shaped portion adapted to straddle the row of cotton as clearly shown in Fig. 2 of the drawings. This axle, as will be hereinafter more fully described, supports the entire machine, and secured to the center of the axle at the upper end is a tongue 5', by means of which the machine is drawn. The tongue, as shown, will be exactly over the row of cotton, and there will be a horse attached to the machine on each side between the row of cotton being picked and the row on either side. The frame 6 of the machine, as shown in Fig. 2, is supported by the lower face of the tongue and secured thereto in any desired manner, but preferably by the clips 7 extending over the tongue.

The frame 6 is preferably made of sheet metal, having an outwardly flared forward end 7' forming a guide to cause the cotton plants to pass between the contracted inner end 8 between the vertical central portion of the axle. In rear of the axle the frame is again flared outwardly, as indicated at 9, so that the cotton plants by their own elasticity spring outwardly and assume a position with the bolls extending outwardly ready to enter the slotted guides, as will be hereinafter more fully described.

The frame in rear of the axle is spaced a distance apart to allow the cotton plants to pass between the same, and is provided with two casings 8' and 9', in which are mounted the picker belts, which will be later described. These belt picker carrying casings as heretofore described are vertically disposed. Within the upper and lower end of each casing is mounted a pulley 12 and 13 over which the picker belts 14 pass. The shaft of the upper pulley 12 passes through the casing, and is provided with a sprocket wheel 15. In alinement with the sprocket wheel 16 and passing over said sprockets are chains 17. The shaft 18 of the sprocket 16 is driven by a beveled gear 19 meshing with the large beveled gear 20 carried by the supporting wheels, whereby the picker belts are caused to travel very fast. The side of the belt adjacent the plant travels upwardly and picks the opened bolls from the cotton plant.

The slotted guides are formed by a series of bars 21 spaced a distance apart to form the guide spaces 22, which communicate with the picker carrying casings, the pickers extending outwardly adjacent the bars, whereby, when the bolls of cotton enter the casings with the stems thereof in the guide spaces 22, the pickers remove the cotton from the open bolls and convey it upwardly. The cotton is carried upwardly and discharged at the outer side into a bag or receptacle, which is arranged as desired.

The bars 21 forming the guide spaces have their forward ends pointed to form the beveled faces 21', to guide the stem of the cotton boll to the spaces 22. Each bar is supported in its horizontal position by a support 23 adjacent the forward end, and said support in no way interferes with the free movement of the stem of the cotton boll or the boll itself through the casings.

The picker belts 14 may be made of any desired material, and are provided with the picker fingers 24. These picker fingers as shown are made of small spring wire, and are securely fastened to the belt. Each finger has a coil or two, 25, at its base adjacent the belt, so that when the fingers come in contact with an unopened boll of cotton they will open laterally and let it pass through. The fingers are set in diagonal rows across the belt in such a way that the end of each row at the front edge of each belt on the side that is passing up in front of that part of the slotted guide that holds the cotton in position to be picked is lower than its opposite side.

As heretofore stated, the two sides are exactly alike, and one side picks the cotton on one side of the plant and the other picks the cotton on the opposite side of the plant.

What I claim as my invention is:

A cotton picker comprising an axle having a vertical U-shaped portion adapted to straddle a row of cotton, supporting wheels rotatably mounted on the axle, a frame secured to the U-shaped portion of the axle, guide bars carried by the frame and arranged on edge in vertical rows, the guide bars being spaced apart to allow the cotton boll stems to pass therebetween, a guide channel having outwardly flared sides for guiding the cotton plants between said rows of guide bars, bevel gears carried by the supporting wheels, horizontal shafts carrying pinions meshing with said gears, sprocket wheels on the shafts, drums rotatably mounted on the frame near the top and bottom ends of each row of guide bars, endless belts passing over each pair of said drums, picker fingers on the belts extending adjacent the guide bars, sprocket wheels attached to the top drums, and sprocket chains connecting the sprocket wheels of the drums to the sprocket wheels on said shafts.

In testimony whereof I affix my signature in presence of two witnesses.

NEWTON KEELING.

Witnesses:
NETTIE E. ROBINSON,
ETHEL M. PENN.

---

Copies of this patent may be obtained for five cents each, by addressing the "Commissioner of Patents, Washington, D. C."